United States Patent

[11] 3,573,590

| [72] | Inventor | John F. Reed |
| | | Middleburg Heights, Ohio |
| [21] | Appl. No. | 882,660 |
| [22] | Filed | Dec. 5, 1969 |
| [45] | Patented | Apr. 6, 1971 |
| [73] | Assignee | The New Britain Machine Company |
| | | New Britain, Conn. |
| | | Continuation-in-part of application Ser. No. 835,441, June 23, 1969. |

[54] HORIZONTAL BORING MACHINE
5 Claims, 9 Drawing Figs.

[52] U.S. Cl........................................................ 318/618,
318/681, 318/326
[51] Int. Cl........................................................ G05b 5/01
[50] Field of Search............................................318/20.427,
20.835, 326, 110, 257

[56] References Cited
UNITED STATES PATENTS

| 3,283,231 | 11/1966 | Askew............................ | 318/30 |
| 3,369,160 | 2/1968 | Koppel et al.................... | 318/20X |
| 3,400,212 | 9/1968 | Plummer........................ | 318/30X |
| 3,411,063 | 11/1968 | Schoonover.................... | 318/326X |

Primary Examiner—Benjamin Dobeck
Attorneys—David S. Urey, Alan C. Rose and Alfred B. Levine ABSTRACT: A machine tool including a movable spindlehead member having an extensible and retractable tool spindle member, and a work-supporting compound slide assembly having two slide members movable in directions at right angles to one another. All members can be selectively "inched" and moved at feed and transverse rates in opposite directions along their respective paths of movement by two variable speed motors, one connectable to the spindlehead or the tool spindle and the other to either of the two slide members of the work-supporting compound slide. The motors are connected to their respective tool and work-moving members through discrete transmissions of the continuously meshed gear type under the control of hydraulically-actuated clutches. Spindle feed is alternatively provided from a spindle drive motor to correlate feed with rotation. Brake discs selectively deflectable against fixed abutments and connected to rotatable parts will maintain selected tool and work-carrying members in fixed positions.

Fig. 1

INVENTOR.
JOHN F. REED

INVENTOR.
JOHN F. REED
BY Watts, Hoffmann,
Fisher & Heinke
ATTORNEYS.

HORIZONTAL BORING MACHINE

CROSS-REFERENCE TO RELATED APPLICATION

This application is a continuation-in-part of my copending application, Ser. No. 835,441, filed Jun. 23, 1969.

FIELD OF THE INVENTION

This invention relates to a machine tool and especially to the manual positioning of a movable tool or work-supporting member thereof.

PRIOR ART

Prior to the present invention it was customary to manually position a tool or work-supporting machine element, such as, the tool spindlehead, worktable, etc., of a horizontal boring machine, a radial drill, or the like, by the operator manually rotating a hand wheel or crank.

SUMMARY OF INVENTION

The present invention provides an apparatus having a member movable by motor means, the actuation of which motor is effected by a manually-operated or driven energy source or power generating means, for example, a hydraulic pump or an electric generator.

The invention more specifically further provides a machine tool having one or more tool and/or work-carrying members selectively movable in one or more directions by one or more variable speed motors, the control for which includes an electrical generating means having a manually-actuated rotatable member, the value and sign of the voltage output of which generating means is a function of the direction of and speed of rotation of the rotatable member whereby the motor or motors can be caused to rotate and in turn the machining tool elements moved and/or adjusted in or in its support by an operator manually turning the rotatable member of the electrical signal generating means.

The invention is not limited to the machine tool art nor to the use of electrical power generators and motors, etc., but is hereby shown merely for the purposes of illustration as embodied in a horizontal boring, milling and drilling machine having four electric motor-driven movable machine tool elements for effecting relative movement between the tool and work, two of the tool spindle and spindleheads for carrying the tool and the other two, the top and bottom members of a compound work-carrying slide.

DESCRIPTION OF PREFERRED EMBODIMENT

Figure 1:
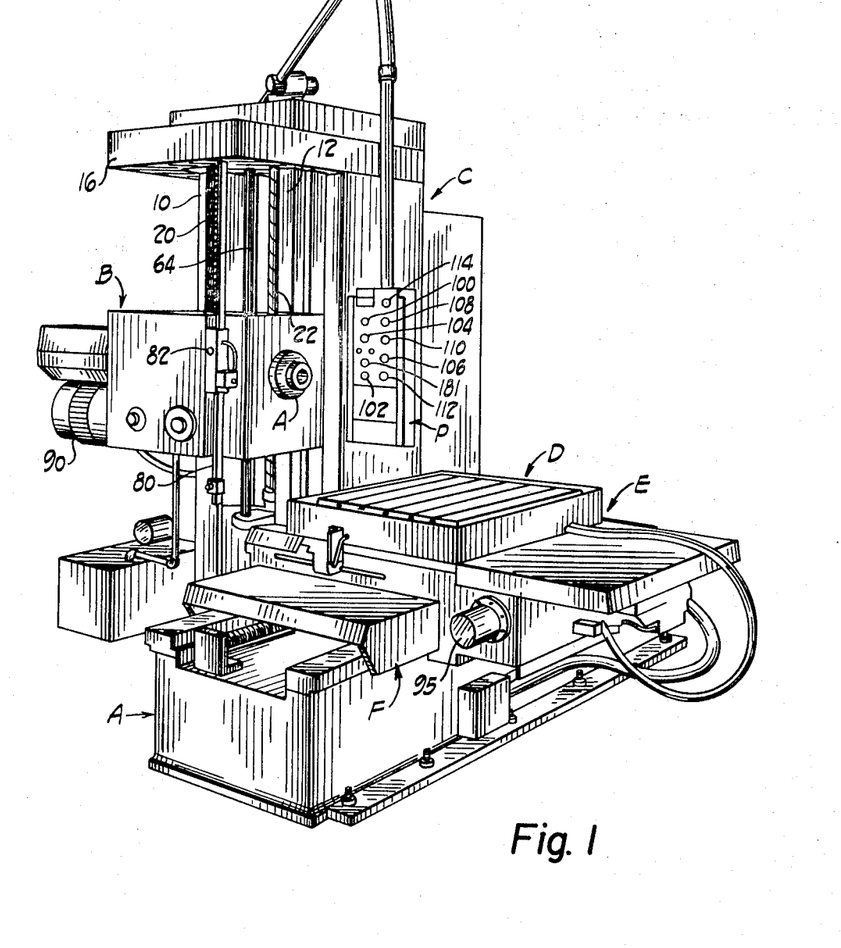
FIG. 1 is a perspective view of a horizontal boring, milling and drilling machine embodying the present invention.

As previously mentioned, the machine tool illustrated is of the type commonly referred to as a horizontal boring machine having boring, drilling and milling capabilities. The tool for any particular machining operation is carried in the front end of a horizontal tool spindle member A rotatable and axially movable in a tool spindlehead member B slidably supported for vertically moving along what is commonly referred to as the Y-axis, on the front face of a column member C forming a part of the frame of the machine. The work to be machined is carried on the table or top slide member D of a compound slide E, the saddle or bottom slide member F which supports the top slide member D for linear movement along the Z-axis parallel with the axis of the tool spindle member A and which is in turn supported for linear movement along the X-axis at right angles to the axis of rotation of the tool spindle on a bed member H to the lower left-hand side of which the lower right-hand side of the column is attached.

The spindlehead member B is moved along vertical ways 10, 12 on the front face of the column member C by a vertically extending lead screw 14 rotatably supported but fixed against axial movement in a column crown member 16 detachably connected to the top of column member C. The screw 14 threads through a stationary nut 18 in the head B with the result that as the screw is rotated the head B is raised or lowered depending upon the direction of rotation of the screw 14. The screw 14 is enclosed within a telescoping guard 22 extending between the head B and the crown member 16. A portion of the weight of the head B is carried by a counterweight (not shown) connected to the head by a chain 20.

Figure 2:
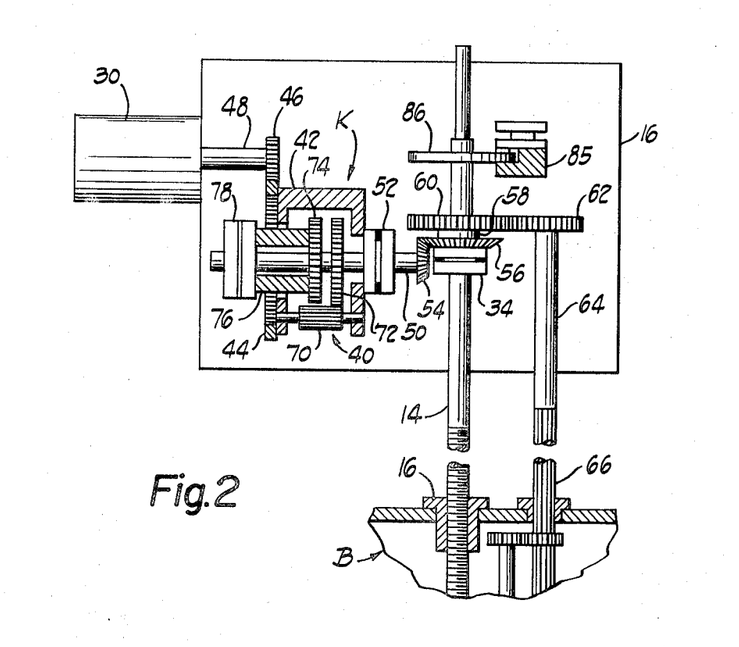
FIG. 2 is a diagrammatic drawing of the drive for moving the tool spindlehead of the machine shown in FIG. 1.

The screw 14 is enclosed within a guard 22 and is adapted to be rotated by an infinitely variable speed reversible electric motor 30 connected to the rear side of the crown member 16 in a suitable manner and connected to the screw 14 by a so-called "constant mesh" drive, see FIG. 2, designated generally by the reference character K and to which the screw 14 is adapted to be selectively connected by an electrically-controlled, fluid actuated normally open or disengaged clutch 34.

The drive K comprises a planetary gear transmission 40 including a rotatable plant gear carrier 42 having an external ring gear 44 fixed thereto which gear is continuously in mesh with a gear 46 on the driven shaft 48 of the motor 30. The carrier 42 is adapted to be selectively detachably connected to a shaft 50 by an electrically-controlled fluid actuated clutch 52 to obtain a high speed drive through the bevel gears 54, 56, the former of which is fixed to the shaft 50 and the latter of which is one gear of an output gear cluster 58 of the drive K. The gear cluster 58 is supported in the crown 16 for rotation about the upper end of the screw 14. A second gear 60 of the gear cluster 58 is continuously in mesh with a gear 62 on the upper end of a shaft 64 depending downwardly from the crown member 16 and which upper end is rotatably supported in the crown member but fixed therein against axial movement. The lower end 66 of the shaft 64 is splined, extends through the spindlehead and provides a drive for reciprocating the tool spindle axially. A description of this latter drive is not necessary to a disclosure of the present invention and may be that shown in a copending application of Heinz K. Wolf, entitled Machine Tool, filed on even date herewith, the disclosure of which application is made a part hereof and incorporated herein reference.

In addition to the ring gear 44, the plant gear carrier member 42 of the transmission 40 carries a wide face planet gear 70 rotatable therein and continuous in mesh with two spur gears 72, 74, the former of which is fixed on the shaft 50 while the latter is fixed to a carrier 76 rotatably supported concentric with the shaft 50. The gear 74 has a lesser number of teeth than the gear 72, for example, may have 40 teeth and the gear 74, 38 teeth. The carrier 76 is adapted to be selectively connected to the head member 16 to drive the gear cluster 58 at a slow speed by an electrically-controlled fluid actuated clutch 78.

The vertical position of the spindlehead member B and in turn the axis of rotation of the tool spindle A with respect to some reference point on the machine can be obtained by the operator by use of end measuring rods and a dial indicator or as in the present machine by a suitably graduated measuring rod 80 suspended from the crown member 16 and which is provided with a suitable adjustable stop or abutment that cooperates with a dial indicator 82 fixed to the spindlehead member B. The spindlehead member B can be moved to any vertical position, that is, located in any desired vertical position by the operator watching the dial indicator 82 and stopping rotation of the screw 14 at the correct time. Provision is made for holding the screw 14 in the position in which its rotation is stopped by application of an electrically-controlled fluid pressure friction brake 85 to the rim portion of a disc 86, fixed to the upper end of the screw 14.

In the machine shown the tool spindle member A is rotated by a spindle drive motor 90 carried by the spindlehead member B and connected to the spindle in a suitable manner. In the same manner, for example, as is the tool spindle member of the machine shown in the aforesaid copending application, driven by the corresponding spindle drive motor.

The construction and operation of the compound slide E is not herein shown and described in detail. Suffice it to say that it is the same as that shown in the aforesaid copending application, and that the slide members thereof are moved in their respective Y-axis and Z-axis by the motor 95 carried by the bottom slide member F which motor is similar to the motor 30, previously referred to.

The motor 30 is, as previously stated, an infinitely variable speed motor and any suitable combination motor and control therefor may be employed. The preferred drive is the so-called silicon-controlled rectifier drive disclosed in my copending application, Ser. No. 835,441, filed Jun. 23, 1969, entitled "Motor Drive System" and which system utilizes silicon-controlled rectifiers and a feedback loop for operating a reversible direct current motor from an alternating source.

The motor 30 drives a feedback tachometer that provides a feedback voltage signal of one polarity or another depending on the direction of rotation of the motor, which voltage signal accurately reflects the speed of rotation of the motor. The output from the tachometer is compared with an input reference signal that indicates a desired speed of the motor. If the reference signal and the signal from the tachometer are not equal in amplitude, silicon-controlled rectifiers that rectify the input AC power supplied to the DC motor become conductive for greater or lesser portions of each half cycle to increase or decrease the speed of the motor and thus vary the output signal from the feedback tachometer until it and the reference speed signal are equal. The drive system operates to maintain the speed of the motor at a substantially constant predetermined speed regardless of load conditions on the motor.

Figure 3:
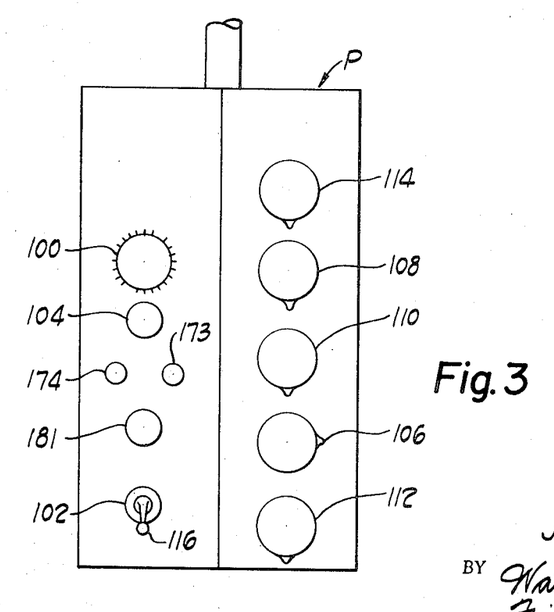
FIG. 3 is an enlarged front elevational view of the pendant control station shown in FIG. 1.

In the present instance the input reference speed signal is obtained from a rotary step potentiometer 100, preferably calibrated in inches per minute of slide travel with the transmission K in its lowest speed range, and alternatively from a manually-operated generator tachometer 102 both of which are located on the pendant control station P. The various calibrated positions of the potentiometer 100 provides a different fixed reference voltage to indicate a different speed of slide movement. Speeds between the potentiometer steps can be obtained by a feed rate override control 104.

Referring to the spindlehead, the direction of the spindlehead movement either up or down is determined by manual operation of the spindlehead control switch 106. The switch is similar to that shown in U.S. Pat. to N. H. Stephan, U.S. Pat. No. 3,139,000 and 3,139,491, and has two positions at opposite sides of neutral or off position. The first position on either side of the off position is the feed position and in which position the control handle for the switch can be latched and the second position is the rapid traverse position. The switch is so oriented that the neutral position is in a horizontal plane and when the control lever is moved in an upwardly direction the feed and rapid traverse movements of the spindlehead are in an upwardly direction. When the control lever is moved in a downwardly direction to its neutral position the feed and rapid traverse movement of the spindlehead are in a downwardly direction.

Figure 5:
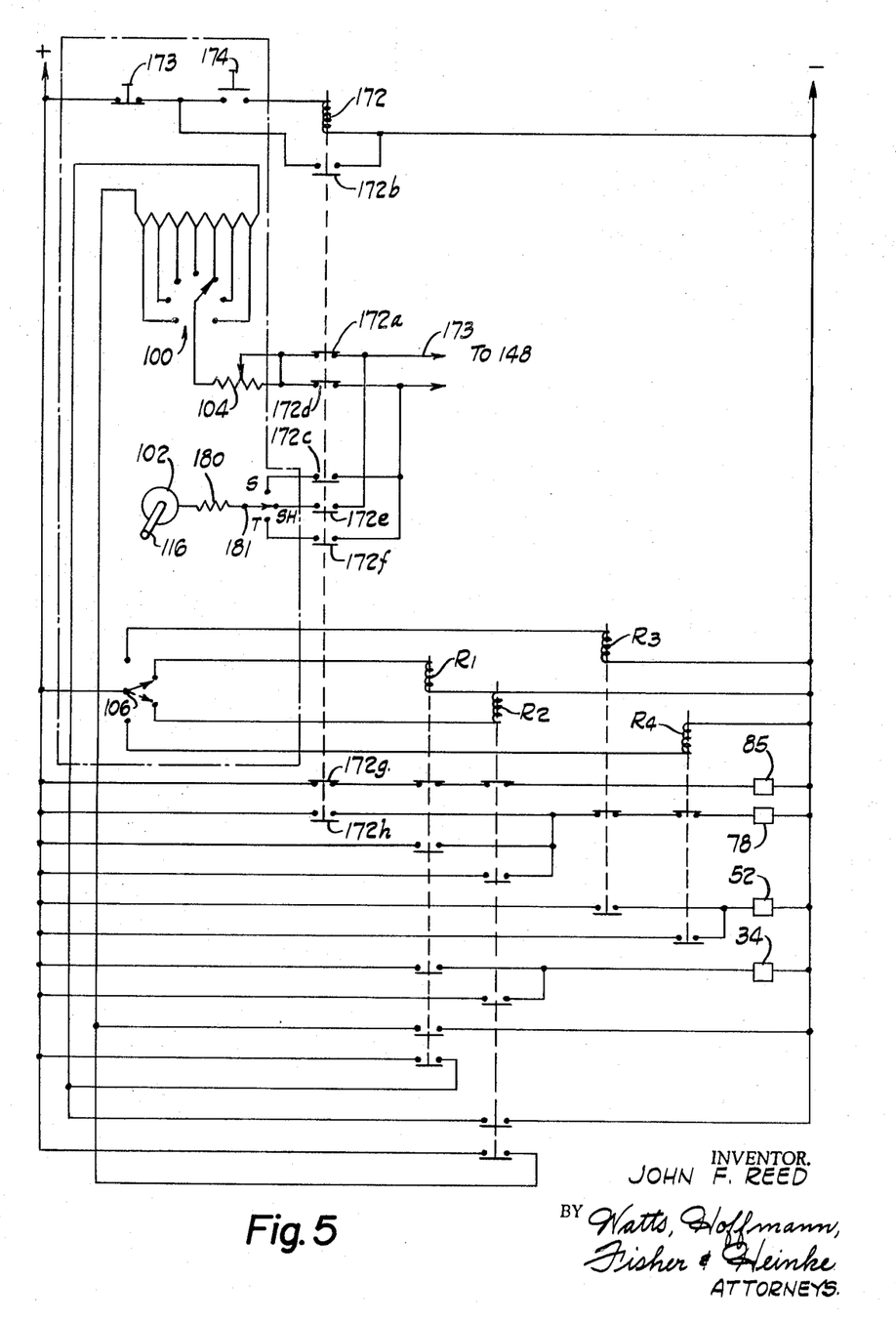
FIG. 5 is a diagrammatic drawing of control circuits in the pendant control station and related auxiliary electrical equipment.

Movement of the control lever 106 to either of its feed positions initiates movement of the spindlehead at a feed rate determined by the setting of the feed rate potentiometer 100 and the feed rate override control lever 104. When the control switch 106 is moved to either of its rapid traverse positions the transmission K is shifted to its high speed mode, that is, the clutch 52 is disengaged and clutch 78 engaged. A schematic diagram of this circuitry is shown in FIG. 5 of the drawings but is not described in detail. Switches 108, 110 and 112, similar to the switch 106, are used to control the spindle feed, bottom slide feed, top slide feed and a similar two-position switch 114 is employed to control rotation of the spindle.

In a normal operation of a horizontal boring machine such as that illustrated herein the spindlehead is seldom moved during a machining operation. The relative movement between the tool and work is normally accomplished either by feeding the spindle axially as in a boring or drilling operation, or feeding the lower side member F transversely of the axis of rotation of the spindle to perform a milling operation. Vertical milling operations can be performed by moving the spindlehead vertically, but milling is normally performed by moving the work transversely of the spindlehead.

The most frequent use of the vertical movement of the spindlehead is for positioning the spindle at a desired vertical location with respect to a workpiece. For example, when it is desired to bore a preformed hole the distance of the center of which above a reference point on the machine is known the spindlehead is moved up or down as the case may be, usually in an upwardly direction so that the upper thread of the screw 14 is always used in positioning, at a rapid or traverse rate until the center of the spindle is approximately at the desired position. Thereafter the movement is continued at a slower rate, with the operator watching the dial indicator, until the spindle is located in the exact desired position. In the present instance the slow positioning input reference signal is obtained by the operator manually rotating the rotor of the tachometer 102 by means of a crank 116 connected to the rotor. The faster the crank is rotated the greater the input signal and the faster the head will move. The direction of movement depends upon the direction of rotation of the crank. As the desired position is approached the operator slows the rotation of the hand crank 116 and in turn decreases the value of the reference signal and discontinues the rotation when the desired location is obtained as indicated by the dial indicator. If the spindlehead has been moved past the desired location it is merely necessary for the operator to reverse the direction of the rotation of the crank a small amount to bring the spindlehead into position.

Figure 4:
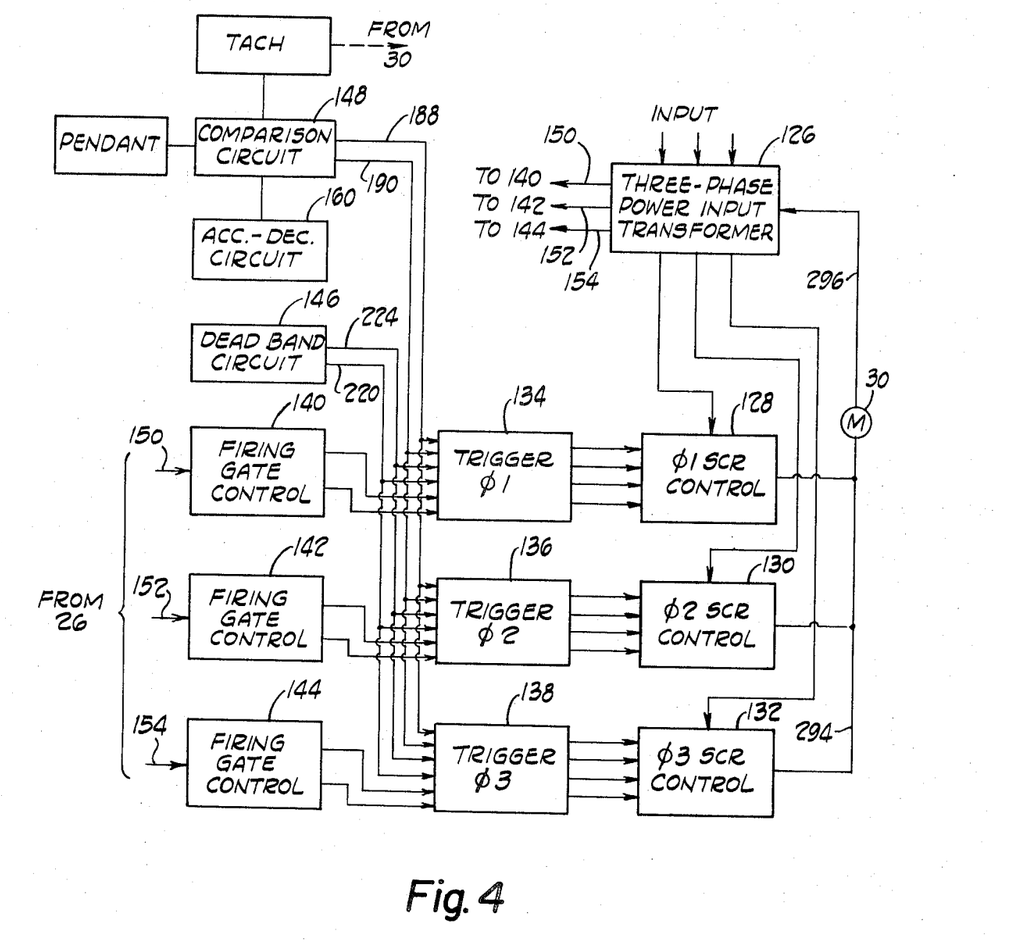
FIG. 4 is a block diagram of the control circuit for the drive motor for the compound slide.

Power for the motor 30, see FIG. 4, is obtained from a secondary winding of a three-phase power input transformer 126 through three silicon-controlled rectifier (SCR) control circuits 128, 130, 132, and the speed at which the motor 30 will rotate and its direction, are controlled by trigger circuits 134, 136, 138, respectively. Each of the triggers 134, 136, 138 receives three pairs of input signals. Firing gate controls 140, 142, 144, respectively, provide one pair of the input signals to the triggers 134, 136, 138. A second pair of input signals is provided to all of the triggers from a dead band circuit 146, and a third pair of input signals is provided to all of the triggers from a comparison circuit 148.

Each firing gate control 140, 142, 144 determines the exact period and duration of time during which a particular SCR in the SCR control circuits 128, 130, 132 may have a trigger pulse applied to it from the triggers 134, 136, 138. The firing gate controls 140, 142, 144 provide enabling signals that permit the triggers 134, 136 and 138 to apply trigger pulses to the various SCR's in the SCR controls only during that period of time when the anodes of those particular SCR's to be triggered are positive. To accomplish this purpose, power is supplied to the firing gate controls 140, 142, 144 on leads 150, 152, 154, respectively, from the secondary winding of the three-phase power input transformer 126.

The dead band circuit 146 provides a pair of signals to the triggers 134, 136, 138 that control the width of the dead band of the system. That is, the signals from the dead band circuit 146 control the range of values over which input signals to the triggers 134, 136, 138 from the comparison circuit 148 may vary without actuating the triggers.

The comparison circuit 148 receives two input signals and provides two output signals that vary from a predetermined level in opposite directions and by amounts that are proportional to the difference in amplitude between the two input signals to the circuit. One of the input signals is provided from the feedback generator tachometer 156 which, as previously pointed out, is driven by the motor 30 and provides an output signal that is proportional to the motor speed and of a polarity determined by the direction of rotation of the motor. The other input signal to the comparison circuit comes either from the feed rate control 100 or from a manually-operated generator tachometer control 102. The electrical signals from the controls 100, 102 serve as reference signals to control the speed and direction of rotation of the motor 30.

The difference signal in the comparison circuit 148 between the signals from either the feed rate control 100 or the manual control 102 and the tachometer 156 is modified by a timed acceleration-deceleration circuit 160 which serves to prevent any fast change in speed of the motor 30. In other words, the circuit 160 acts to adjust the electrical time constant of the control circuit to match the mechanical time constant of the drive system. In addition, it prevents following circuitry from going into saturation, and allows the motor to change to a different desired speed under control of the speed control system.

Figure 6:
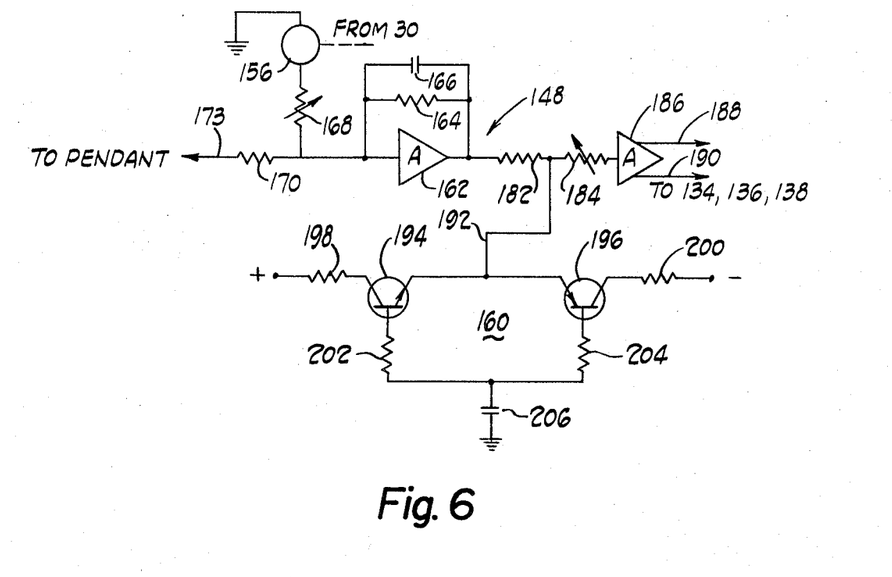
FIGS. 6 to 9 are diagrammatic drawings of parts of the control circuit shown in FIG. 4.
Figure 7:
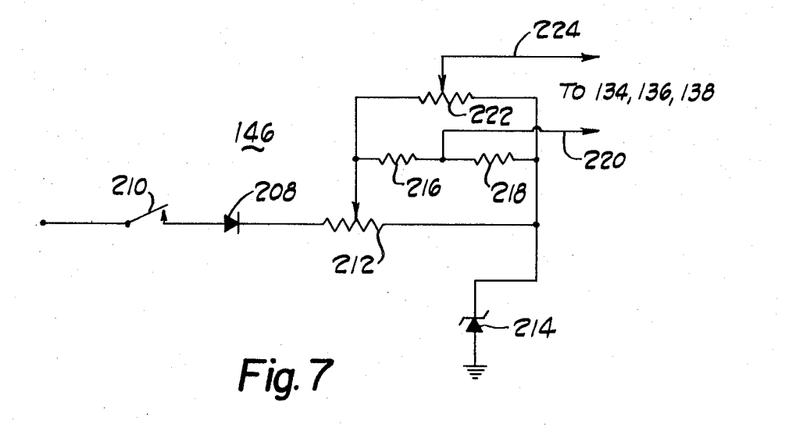

The comparison circuit 148, see FIG. 6, includes an operational amplifier 162, which is provided with the usual parallel combination of a feedback resistor 164 and a capacitor 166. Input to the amplifier 162 is from the output of the tachometer 156 through a variable resistor 168, and from either the feed rate control 100 or the manual speed control 102 through a resistor 170. The polarities of the signals provided from the tachometer 156 and from either of the control circuits 100, 102 are opposite. They are added algebraically and the resultant representing the difference in amplitude between the two signals is amplified by the amplifier 162. The variable resistor 168 provides calibration for initially balancing the tachometer output signal and the reference signal when the motor is rotating at the correct speed.

The feed rate control 100 is a rotary potentiometer switch, each position of which provides a different fixed reference voltage to the comparison circuit to indicate different desired speeds and is connected to the resistor 170 through a normally-closed section 172a of a relay 172 and a lead 173. The relay 172 is connected to be energized from a source of positive voltage (not shown) through a normally-closed manually-actuatable switch 173 and a normally-open, manually-actuatable switch 174 and is provided with a conventional holding circuit including normally-open section 172b. When the switch 174 is open as shown, the signal from the feed rate control 100 is connected into the summing amplifier 162.

The relay 172 has a third, normally-open section 172c which serves to connect the manual control 102 to the input of the amplifier 162, through a resistor 180, a spindlehead, saddle and table selector switch 181 and the lead 173. When the manually-actuatable switch 174 is closed, the contact 172a opens and the contact 172c closes and the reference signal source transferred from the feed rate control 100 to the manual control 102. In addition to the relay sections or contacts 172a—c, previously referred to, the relay 172 has a plurality of further sections or contacts 172d—h. The section 172d corresponds with the section 172a but connects the feed rate control 100 to the drive for the motor 95. The sections 172e—f correspond with the section 172c except they are connected to the saddle and table contacts S and T respectively of the selector switch 181, and to the drive of the motor 95, whereas the section 172c connects the spindlehead contacts SH of the selector switch 181 to the drive for the motor 30. Sections 172g—h are in auxiliary circuits for controlling the engagement of the brake 85 and the clutch 78, respectively. These latter sections of the relay 172 are in series circuit with one or more of the feed and rapid traverse relays R1-4 associated with the spindle control switch 106. Additional sections or contacts, not shown, are provided on the relay 172 for the auxiliary operations necessary for control of the movement of the respective slides of the compound slide E.

The output of the operational amplifier 162 is connected through a fixed resistor 182 and a series-connected variable resistor 184 to an input of a complementary output amplifier 186. The variable resistor 184 serves as a system gain control. The amplifier 186 provides linearly complementary output signals that vary about a predetermined level such, for example, as +10 volts. That is, as one output signal goes more positive, the other output signal goes more negative by an equal amount and vice versa. These complementary signals are provided on output leads 188, 190.

The timed acceleration-deceleration circuit 160 is connected by means of a lead 192 to a juncture between the resistors 182, 184. The circuit 160 comprises an NPN transistor 194 and a PNP transistor 196, which serve as switches. The emitters of the transistors 194, 196 are connected together and to the lead 192. The collector of the transistor 194 is connected through a resistor 198 to a positive potential source (not known), and the collector of the transistor 196 is connected through a resistor 200 to a negative potential source (not shown). The bases of the transistors 194, 196 are respectively connected through resistors 202, 204 to one side of a capacitor 206, the other side of which is grounded.

In operation, if the voltage applied to the emitter of the transistor 196 through the lead 192 exceeds the base-to-emitter standoff voltage of that transistor, then the transistor 196 will start to conduct. This causes the capacitor 206 to charge through the emitter-base circuit of the transistor 196 until its charge approximately equals the emitter voltage of the conducting transistor 196. The charging rate of the capacitor 206 determines the rate at which current is supplied to the input of the complementary output amplifier 186. When the input voltage through the lead 192 changes so that it exceeds the base-to-emitter standoff voltage of the transistor 194, the same action occurs, but conduction is through the transistor 194 to discharge the capacitor 206 until its charge approximates the emitter voltage of the transistor 194. In other words, if the voltage on the emitters of the transistors 194, 196 goes suddenly in a positive direction, the transistor 196 will conduct to charge the capacitor 206 positively. Conversely, if the voltage on the emitters of the transistors goes suddenly in a negative direction, the transistor 194 will conduct to discharge the capacitor 206. Thus, a timed acceleration or deceleration function is obtained by charging and discharging the capacitor 206.

The particular advantage of using the transistors 194, 196 in the configuration shown is that the charging and discharging rates of common capacitor 106 take advantage of the current gain (beta) of the transistors and allows a much smaller capacitor to be used than if a passive resistance-capacitance network were used.

The dead band circuit 146 serves to set the dead band of the control system, within which it will not respond to variations is output signals from the complementary amplifier 186 and it provides a signal to the triggers 134, 135, 138 to adjust each of the triggers so that each trigger responds in a similar manner to both positive and negative half-cycles of the input voltage. The circuit 146, see FIG. 4, comprises a diode 208, whose anode is connected through a switch 210 to a positive potential source (not shown). The cathode of the diode 208 is connected through a potentiometer 212 to the cathode of a Zener diode 214; the anode of the Zener diode 214 is grounded. Two fixed resistors potentiometer 212 and the cathode of the Zener diode 214. An output signal is obtained on a lead 220 connected to a juncture between fixed resistors 216, 218. A potentiometer 222 is similarly connected between the movable arm of the potentiometer 212 and the cathode of the Zener diode 214. An output signal is also obtained on a lead 224 connected to a movable arm of the potentiometer 222. The leads 220, 224 serve as input leads to the triggers 134, 136, 138.

In operation, the switch 210 serves as an "on-off" switch for the control system. If the switch 210 is open, no output signals will be provided from the triggers 134, 136, 138 to the SCR controls 128, 130, 132 and the motor 30 will not be energized. When the switch 210 is closed as shown, certain positive voltages will be applied through the leads 220, 224 to the triggers 134, 136, 138. The voltages so applied are basically controlled by the setting of the movable arm of the potentiometer 212. As will later become apparent in connection with the description of the triggers, the setting of the movable arm of the potentiometer 212 determines the dead band of the control system. The purpose of the potentiometer 222 is to permit the signals on the leads 220, 224 to be equal in amplitude. Thus the potentiometer 222 serve as a balance adjustment for the portions of each trigger circuit that respond to positive-going and negative-going half-cycles of input voltage.

Figure 8:
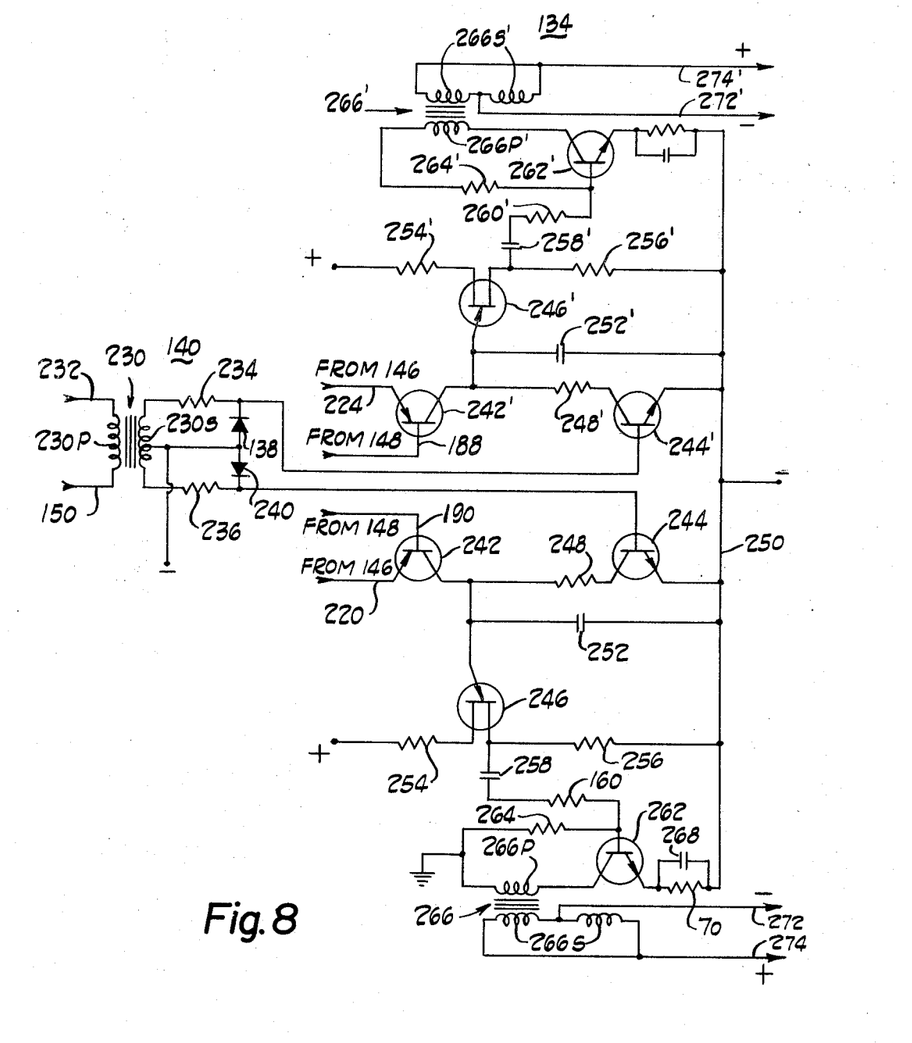
Figure 9:
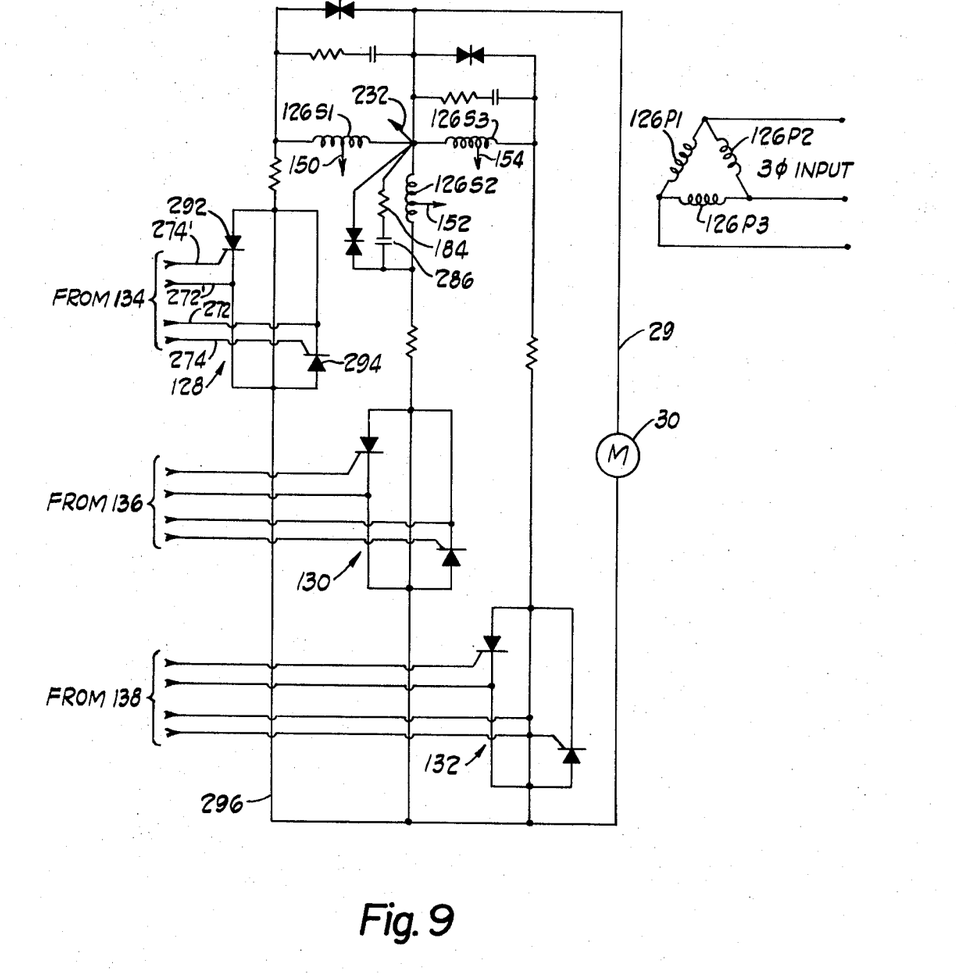

Inasmuch as the firing gate controls 140, 142, 144 are identical and the triggers 134, 136, 138 are identical, only the firing gate control 140 and the trigger 134 will be described in detail. The firing gate control 140, see FIG. 8, comprises a transformer 230 having a primary winding 230P. One end of the primary winding 230P is connected to the lead 150 from the three-phase power input transformer 126, and the other end of the primary winding is connected to a lead 232. The secondary windings 126S1, 126S2, 126S3 of the power input transformer 126 are connected in the form of a wye configuration (as best seen in FIG. 9), and the lead 232 is connected to the center of the wye. The lead 232 is common to all three of the firing gate controls 140, 142, 144.

A center tap on the secondary winding 230S of the transformer 230 is connected to a negative potential source (not shown). Opposite ends of the secondary winding 230S are respectively connected through resistors 234, 236 to the cathodes of diodes 238, 240. The anodes of the diodes 238, 240 are connected together and to the center tap on the secondary winding 230S of the transformer 230. The secondary winding 230S of the transformer 230 provides positive voltages to the bases of two transistors in the trigger circuit 134. The purpose of the diodes 238, 240 is to prevent breakdown of those transistors when the voltages across the secondary winding 230S reverse in polarity.

The trigger 134 is divided into two sections shown as upper and lower mirror images in FIG. 8. One section responds to one half-cycle of each alternating current input cycle and the other section responds to the other half cycle. Only one section will be described in detail. The same reference numerals are applied to like components of both sections but with those of the upper section being shown followed by a prime suffix. The lower section of the trigger 134 comprises a PNP charge control transistor 242, an NPN gate transistor 244, and a unijunction transistor 246. The upper section comprises similar transistors 242', 244' and 246'.

The input connections to the transistors 242, 242' are different, but otherwise the circuitry of the two sections is identical. The base of the transistor 242 is connected to the lead 190 from the complementary amplifier 186 in the comparison circuit 148, while the base of the transistor 242' is connected to the lead 188 from the amplifier 186. The emitter of the transistor 242 is connected to the lead 220 from the dead band circuit 146, while the emitter of the transistor 242' is connected to the lead 224 from the dead band circuit. With those noted differences, the upper and lower sections of the trigger are identical and only the lower section will be described.

The collector of the transistor 242 is connected through a resistor 248 to the collector of the transistor 244. The emitter of the transistor 244 is connected to a negative potential source (not shown) by means of a lead 250. A charge control capacitor 252 is connected between the collector of the transistor 242 and the negative lead 250. When the charge control transistor 242 is conductive, the charge control capacitor 252 will charge; when the gate transistor 244 is conductive, the charge control capacitor is shorted by the transistor 244.

The collector of the charge control transistor 242 and one side of the charge control capacitor 252 are connected to the emitter of the unijunction transistor 246. One base of the transistor 246 is connected through a resistor 254 to a positive potential source (not shown) and the other base of the transistor 246 is connected through a resistor 256 to the negative lead 250. The base of the transistor 246 that is connected to the resistor 256 is also connected through a capacitor 258 and a series-connected resistor 260 to the base of an NPN buffer amplifier transistor 262. The base of the transistor 262 is also grounded through a resistor 264. The collector of the transistor 262 is connected to ground through a primary winding 266P of a pulse transformer 266. The emitter of the transistor 262 is connected to the negative lead 250 through a parallel combination of a capacitor 268 and a resistor 270. The pulse transformer 266 has a pair of secondary windings 266S, which are connected in parallel. The primary and secondary windings of the transformer 266 are so arranged that negative and positive output signals are provided on leads 272, 274, respectively, from the secondary winding 266S when the transistor 262 conducts.

As an aid to understanding the operation of the circuitry thus far described, assume first that the drive motor 30 is in a desired direction but is not running at the desired speed. Therefore, there will be a signal of a given polarity and amplitude at the input to the operational amplifier 162. This will cause an unbalance between the output signals of the complementary amplifier 186. For example, the output signal on the lead 188 might be at +12 volts, while the signal on the output lead 190 might be at +8 volts. Further assume that the dead band circuit 146 has been so adjusted that the output signals on the leads 220, 224 are both approximately +10 volts. This means that the base of the transistor 242' in the trigger circuit will be more positive than the emitter of that transistor, and so the transistor 242' will be nonconductive and the charge control capacitor 252' will not charge. On the other hand, the emitter of the transistor 242 in the other section of the trigger circuit will be positive with respect to the base of the transistor, which will permit the charge control capacitor 252 to charge at a predetermined rate. When the capacitor 252 has charged to the emitter peak voltage point of the unijunction transistor 246, the transistor 246 conducts and the capacitor 252 discharges through the transistor 246 and the resistor 256. This provides a positive pulse through the capacitor 258 and the resistor 260 to the base of the buffer amplifier transistor 262, which causes that transistor to conduct. The resulting output pulse from the transistor 262 is transmitted through the pulse transformer 266 to the output leads 272, 274.

If now the motor is caused to reverse direction but is not running at a desired speed, the input signal to the operational amplifier 162 in the comparison circuit 148 will be of opposite polarity to that previously described. The signal on the output lead 188 will be less positive than 10 volts and the signal on the output lead 190 will be more positive than 10 volts. This will cause the charge control transistor 242' on the trigger 134 to become conductive and the transistor 242 to become nonconductive. Thus, discharge of the charge control capacitor 252' through the unijunction transistor 246' will cause output pulses to appear on the leads 272', 274'. As will be later explained, output pulses on the leads 272, 274 cause the motor 30 to rotate in one direction, while output pulses on the leads 272', 274' cause the motor to rotate in a reverse direction.

The purpose of the gate transistors 244, 244' is to permit their respective charge control capacitors 252, 252' to discharge alternately each half cycle. That is, when the upper end of the transformer secondary winding 230S goes positive each alternate half cycle, the transistor 244' becomes conductive and effectively short circuits the charge control capacitor 252' to discharge it. A similar action occurs during alternate half-cycles wherein the gate capacitor 244 becomes conductive to discharge the charge control capacitor 252. Thus, neither of the charge control capacitors 250, 250' can charge for more than one half-cycle of the alternating-current input voltage to the SCR control associated with that particular trigger.

As previously pointed out, the signals from the comparison circuit on the leads 188, 190 vary in amplitude about a fixed positive voltage level in accordance with the amplitude and polarity of the error signal at the input of the complementary amplifier 186. If the error signal is of one polarity, the signal on the lead 188 will be more positive than that on the lead 190. If the error signal is of the other polarity, the signal on the lead 190 will be more positive than that on the lead 188.

Which of the signals in most negative controls which of the charge control transistors 242, 242' become conductive. The degree to which either transistor 242, 242' conducts depends on the amount by which its emitter potential (on leads 220 or 224 from the dead band circuit 146) exceeds its base potential (on leads 188 or 190 from the complementary amplifier 186). The degrees of conduction of the transistors 242, 242' respectively control the charging time constants of the charge control capacitors 252, 252'. This, of course, determines the time in a half-cycle when the charge across one of the capacitors 252, 252' will equal the emitter peak voltage level of its associated unijunction transistor 246, 246' and cause an output pulse to appear on the leads 272, 274 or 272', 274'.

It is pointed out that the control system does not permit the motor 30 to run at an absolutely constant speed. There is always some slight "jockeying" between the actual speed of the motor and the desired speed of the motor. This is caused by the fact that there must be some difference in the output signals on the leads 188, 190 from the complementary amplifier 186 in the comparison circuit 148 to cause any rotation of the motor. If both signals from the comparison circuit 148 are equal to both signals from the dead band circuit 146, neither of the charge control transistors 242, 242' will become conductive and there will be no power supplied to the motor. Nevertheless, it has been found in practice that a desired speed of rotation of the motor 30 can be controlled under various load conditions to within 1 percent of the desired value.

The power input transformer 126, see FIG. 9, has three primary windings 126P1—126P3 connected in a delta configuration. It also has three secondary windings 126S1—S3 connected in a wye configuration. A common point of the secondary windings is connected to the previously mentioned lead 232. Each of the secondary windings 126S1—S3 is tapped to provide the signals on the conductors 150, 152, 154 to the firing gate controls 140, 142, 144, respectively. Each of the transformer secondary windings is also provided with a series combination of a capacitor and a resistor for transient suppression. The winding 126S1 has connected thereacross a resistor 280 and a capacitor 282; similarly connected across the winding 126S2 are a resistor 284 and a capacitor 286; and a resistor 288 and a capacitor 290 are connected in the same fashion across the winding 126S3.

The SCR controls 128, 130, 132 are respectively connected to the outer ends of the secondary transformer windings 126S1, 126S2, 126S3. Inasmuch as the SCR controls 128, 130, 132 are identical to each other in construction, and differ only in the source from which they obtain their input signals, only the SCR control 128 will be described in detail.

The control 128 comprises a pair of SCR's 292, 294. The anode of the SCR 292 and the cathode of the SCR 294 are connected to the outer end of the secondary winding 126S1. The cathode of the SCR 292 and the anode of the SCR 294 are connected through a lead 296 to one side of the DC reversible motor 30. The other side of the motor is connected to the center point of the wye of the transformer secondary through a lead 298. A Thyrector 300 is connected in parallel either the secondary winding 126S1 of the transformer 126, as shown, or in parallel with the SCRs 292, 294. When connected in parallel with the secondary winding 126S1 a resistance 302 is connected in the line leading to the SCRs 292, 294. The Thyrector 300 comprises back-to-back, selenium rectifiers which serve to clip any transients that might cause the SCRs 292, 294 to fire falsely. The SCR 292 has a gate electrode which is connected to the lead 274' from the trigger 134. The cathode of the SCR 292 is connected to the lead 272' from the same trigger. The SCR 294 has a gate electrode that is connected to the lead 274 from the trigger 134, and the cathode of the SCR 294 is connected to the lead 272 from that same trigger. The SCR controls 130, 132 are constructed similarly to the control 128, but receive their control signals from the triggers 136 and 138, respectively, rather than from the trigger 134.

In operation, during one half-cycle of each full cycle of alternating current input, the anode of the SCR 292 will be positive. If, sometime during that positive half-cycle, a positive pulse trigger signal is received on the lead 274', the SCR 292 will become conductive. Thus, current will flow in a counterclockwise direction around the circuit to cause the motor 30 to rotate in one direction and at a speed determined by the point in time during the positive half-cycle of input voltage that a trigger pulse was received on the lead 274'. The SCR 292 will continue to conduct during the remainder of that positive half-cycle after it has received the trigger and will cease conduction only when its anode becomes negative with respect to its cathode. As previously pointed out, trigger signals cannot be provided simultaneously on both the pairs of leads 272, 274 and leads 272', 274'. Thus if signals are received on the leads 272', 274', the SCR 294 will not become conductive and current will flow in only one direction through the motor 30.

On the other hand, if it is desirable to have the motor rotate in the opposite direction, the control system will provide trigger signals on the leads 272, 274 and not on the leads 272', 274'. In this case, current will circulate in a clockwise direction through the circuit to cause the motor to rotate in an opposite direction from the first example given.

The same operational example applies to the SCR controls 130, 132 which operate on the other phases 126S2, 126S3 of the transformer secondary. As was previously pointed out, a positive signal can appear on the conductor 274' only when the anode of the SCR 292 is positive. Similarly, a positive signal can appear on the lead 274 only when the anode of the SCR 294 is positive. Thus, positive turn on of the desired SCR is assured.

The motor drive circuit provides a system that permits the motor 30 to be quickly reversed in its direction of rotation or its speed changed without stopping the motor. The system provides self-braking of the motor if the load causes the motor speed to increase.

When the reference signal source is transferred to the manual speed control 102 it will be apparent that the motor 30 can be rotated in either its forward or its reverse direction and at a desired speed by the operator rotating the crank 116 of the tachometer 102 in the proper direction and at the required speed. This allows the operator to inch or mob the spindlehead to the exact desired position. In other words, to inch the spindlehead the operator cranks the generator tachometer according to the provisions of the present invention rather than manually cranking the lead screw 14 as is the case with the prior art.

A drive circuit similar to that described above is provided for the motor 95. It is not necessary, however, to provide the motor 95 with its own power input transformer. A single power transformer of suitable size may be employed with the two drive circuits connected in parallel to the transformer. The slide members D and E are moved by the motor 95 in a manner similar to that in which the spindlehead B is moved by the motor 30.

From the foregoing description of the preferred embodiment it will be apparent that there has been provided a machine tool having one or more tool and/or work-carrying members selectively movable in one or more directions by variable speed motors, the control for which includes an electrical generating means having a manually-actuated rotatable member such that the direction of and speed of movement of the member or members is a function of and speed of rotation of the manually-actuated rotatable member. As previously mentioned the invention is not limited to the use of electric motors or to the machine tool art and it is the intention to cover hereby all adaptations and modifications of the apparatus disclosed which come within the practice of those skilled in the art to which the invention relates and the scope of the appended claims.

I claim:

1. In a device of the character referred to a support structure, a member movable to one or more positions in or on said support structure, a reversible direct current electric motor operable from an alternating current power source for moving said member, a first electric tachometer driven by said motor for providing a first electric signal the polarity and amplitude of which are functions of the direction and speed of rotation of the motor, a manually-operated second electric tachometer for providing a second electric signal the polarity and amplitude of which are functions of its direction and speed of rotation, comparison means for comparing said first signal and said second signal and providing a difference electric signal proportion to difference in absolute amplitudes of said signals, controlled rectifier means connected to a power source and to said motor for supplying controllable amount of current to said motor, a firing gate control connected to the power source, and trigger means connected to said firing gate control means to said comparison means and to said controlled rectifier means, said trigger means comprising two sections respectively capable of providing electrical trigger pulses to said controlled rectifier means during positive and negative half-cycles of current supplied from the power source to cause conduction thereof during alternate half-cycles of current supplied from the power source of a polarity and at a time in each said half-cycle determined by the polarity and amplitude of said difference signal, said firing gate control providing electrical control signals to said trigger means to enable said trigger means to provide said trigger pulses to said controlled rectifier means only when said controlled rectifier means is in a condition to be conductive.

2. In a device as claimed in claim 1, wherein each section of the trigger means comprises a capacitor, charging means for charging said capacitor, and discharge means for discharging said capacitor to provide said trigger pulses.

3. In a device as claimed in claim 2, wherein each section further includes shorting means in parallel with said capacitor for preventing charging of said capacitor during alternate half-cycles of current supplied from the power source.

4. In a device as claimed in claim 3, wherein said charging means comprises a transistor whose degree of conduction is controlled by said difference signal.

5. In a device as claimed in claim 2, wherein said discharge means comprises a unijunction transistor having an emitter connected to said capacitor.